United States Patent [19]

Génevois et al.

[11] 4,049,900
[45] Sept. 20, 1977

[54] CONTINUOUS GRAPHITIZING FURNACE WITH A VERTICAL DISPLACEMENT OF THE CHARGE

[75] Inventors: Jean Louis Génevois, Milan; Rolando Bufarale, Narni Scalo, both of Italy

[73] Assignee: Elettrocarbonium S.p.A., Milan, Italy

[21] Appl. No.: 690,178

[22] Filed: May 26, 1976

[30] Foreign Application Priority Data

May 26, 1975 Italy .................................. 49789/75

[51] Int. Cl.² ............................................. H05B 3/60
[52] U.S. Cl. ............................................. 13/7; 13/23
[58] Field of Search ................................. 13/7, 20, 23

[56] References Cited

U.S. PATENT DOCUMENTS

| 1,029,121 | 6/1912 | Heroult | 13/23 X |
| 1,242,341 | 10/1917 | Fulton | 13/23 |
| 3,522,006 | 7/1970 | Legendre | 13/7 X |

*Primary Examiner*—R. N. Envall, Jr.
*Attorney, Agent, or Firm*—DeLio and Montgomery

[57] ABSTRACT

This invention relates to a method and apparatus for manufacturing carbon articles such as cylindrical electrodes, by employing a continuous operation wherein the electrodes are charged into a suitable apparatus and atmosphere, heated and thereafter cooled and discharged therefrom.

10 Claims, 7 Drawing Figures

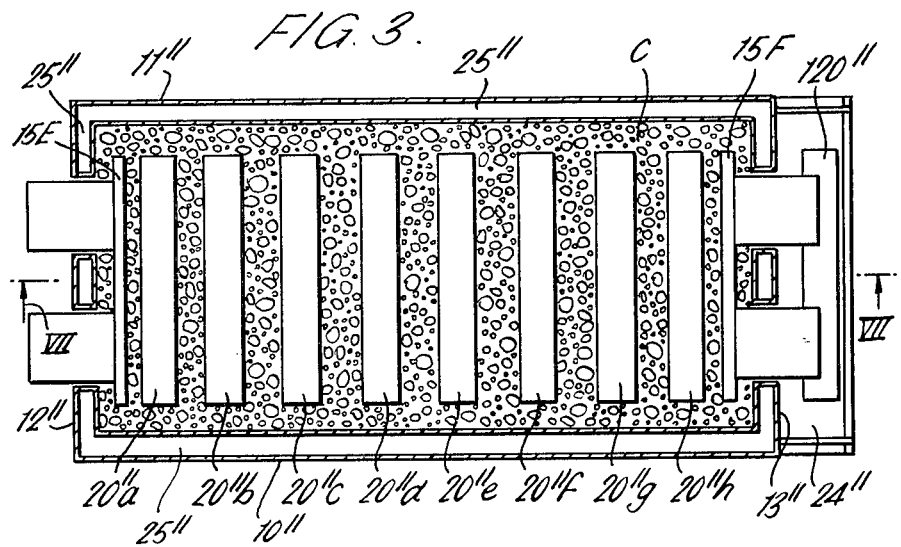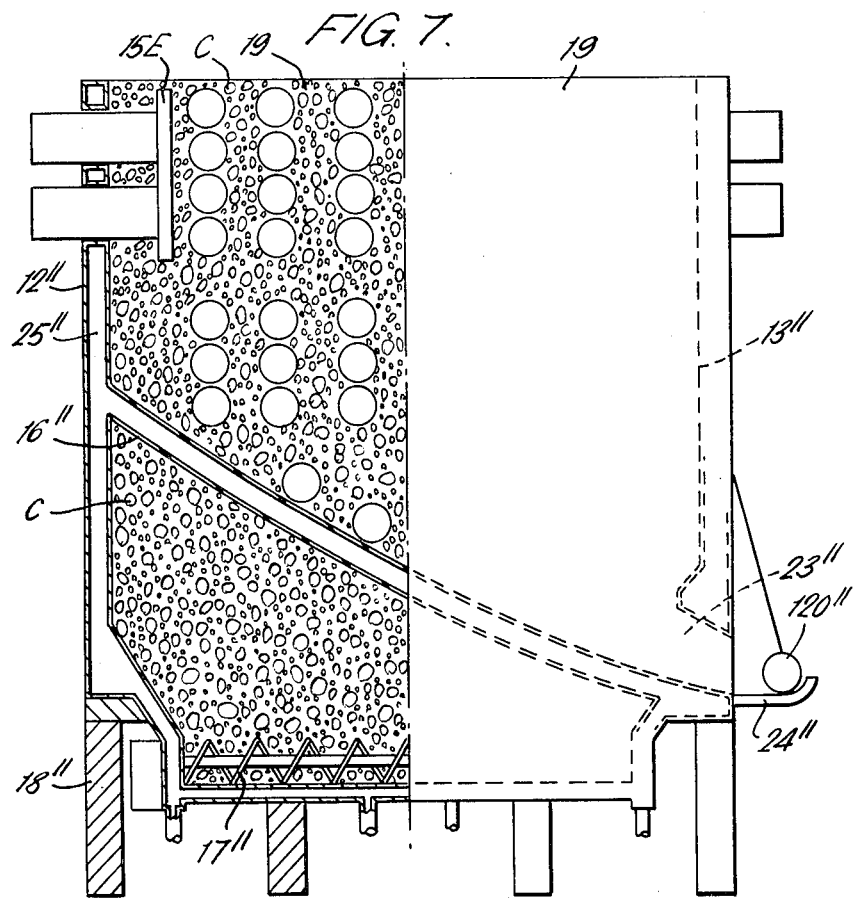

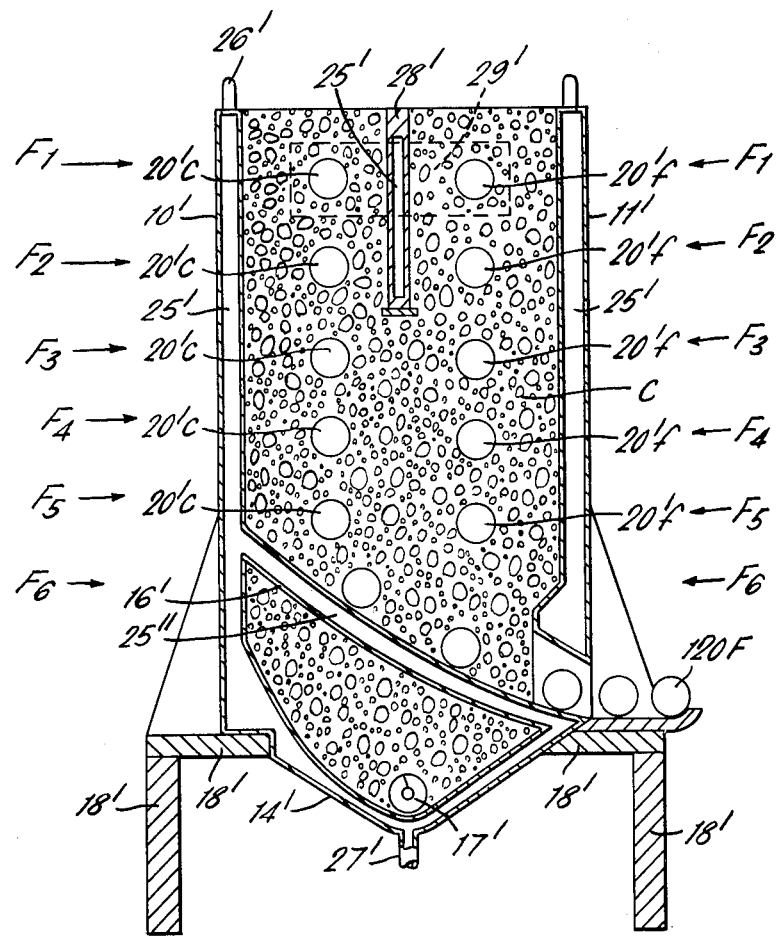

CONTINUOUS GRAPHITIZING FURNACE WITH A VERTICAL DISPLACEMENT OF THE CHARGE

This invention relates to graphitizing furnaces and more particularly concerns an improvement in graphitizing furnaces for manufacturing articles made of carbon, and particularly for manufacturing graphitized cylindrical electrodes for electric-arc furnaces.

The graphitizing process (i.e., the heating of the amorphous carbon material up to 2800° C) is required to minimize the electrical resistance to the current flow in the carbon articles (more particularly cylindrical electrodes for arc furnaces) and maximize the mechanical strength in respect of stresses, specially stresses resulting from temperature gradients from point to point and, for a same point, from instant to instant.

Graphitizing temperature cannot be reached in fire furnaces.

The most traditional and widely used graphitizing furnaces are the resistance furnaces of Acheson type which fundamentally are furnaces wherein the material to be graphitized, previously baked at 1000° C, is a part of the furnace resistance.

Electrodes are piled with their axis trasversally to the electric-current flow, granulate coke forming the most part of the furnace resistance being interposed between the piles, which are longitudinally spaced in the electric-current flow.

Acheson furnaces, which are widely utilized, have the following disadvantage:

a. They are discontinuous;

b. A battery of furnaces is required for each productive unit, which involves the displacement of the transformer group and, consequently, a waste of time for displacing the electrical connections after each power-cycle;

c. There is often a lack of uniformity in the electrical resistance of the furnace and, consequently, in the current density from point to point in the furnace section, and, accordingly, there is a thermal cycle which is too fast in some points, with an inherent danger of cracks, and the possibility that the graphitizing temperature is not reached in other points;

d. The thermal capacity of the resistance material is higher than the useful charge, the coke being heated as well as the electrodes, which coke is not a useful material;

e. Since the granular coke forms the electrical resistance, the heating of the electrodes is practically indirect which results in very long heating cycles (60 to 80 hours) with a consequential long use of the electrical supply apparatus and a higher accumulation of heat in the insulating material surrounding the charge.

Recently, in the Acheson-type furnaces, longitudinal graphitizing furnaces are utilized wherein the amorphous electrodes are arranged with their axes parallel to the current flow and in abutting electrical contact.

Accordingly the following advantages are reached:

The granular insulating material is eliminated and the useful charge in the total resistance of the furnace.

The heating is now direct and the Joule effect is induced in the electrodes to be heated and, accordingly, very short heating cycles are made possible, lasting approximately 10 hours in comparison to the 60 to 80 hour cycles of the Acheson type furnaces.

Since the heating cycles are much shorter, a lower heat quantity is accumulated in the insulating material which, being cooler, is more efficient.

The danger of heating uneveness in the useful charge of the furnace is minimized.

However, the disadvantage of discontinuity the process persists, which involves performing, for each cycle in a given furnace the following steps:

locating the walls defining the insulating material;
preparing the insulating material;
locating the amorphous electrodes;
covering the same with the insulating material;
connecting the supplies of electric power and refrigerating fluid to the furnace;
opening the furnace and removing the insulating material;
removing the graphitized electrodes;
preparing again the insulating material, after locating the walls defining the insulating material.

The above operations are costly as the utilization of skilled labour is required.

Then, an attempt was made to eliminate the waste of time involved in displacing the connecting electric bars as in German Pat. No. 2.0187764 of SIGRI ELEKTROGRAPHIT GmbH, but in this arrangement (which provides a fixed transformer provided with a head electrode, while a plurality of furnaces, sliding on rails, is circumferentially arranged around the transformer the displacement of the furnaces is still required which involves a discountinuous operation for charging and discharging the furnaces.

This invention describes a furnace for graphitizing electrodes to be used in electric-arc furnaces for steel production, wherein the electrode production is continuous.

In the furnace upper part the graphitizing cycle is performed while in the lower part, at lower and lower levels, the cooling cycle of the graphitized electrodes takes place, until the suitably cooled electrodes come out of the furnace lower part. The exit means is a cooled grate suitably sloped.

The improved furnace according to the invention will be now more particularly illustrated with reference to three embodiments thereof which are shown in the accompanying drawings, wherein:

FIG. 3 is a horizontal section of a third embodiment wherein the electrodes are arranged trasversally to the electric current flow;

FIG. 6 is a fragmentary and schematic sectional view taken along line VI—VI of FIG. 2; and FIG. 7 is a similar sectional view taken along line VII—VII of FIG. 3.

Figure 1:
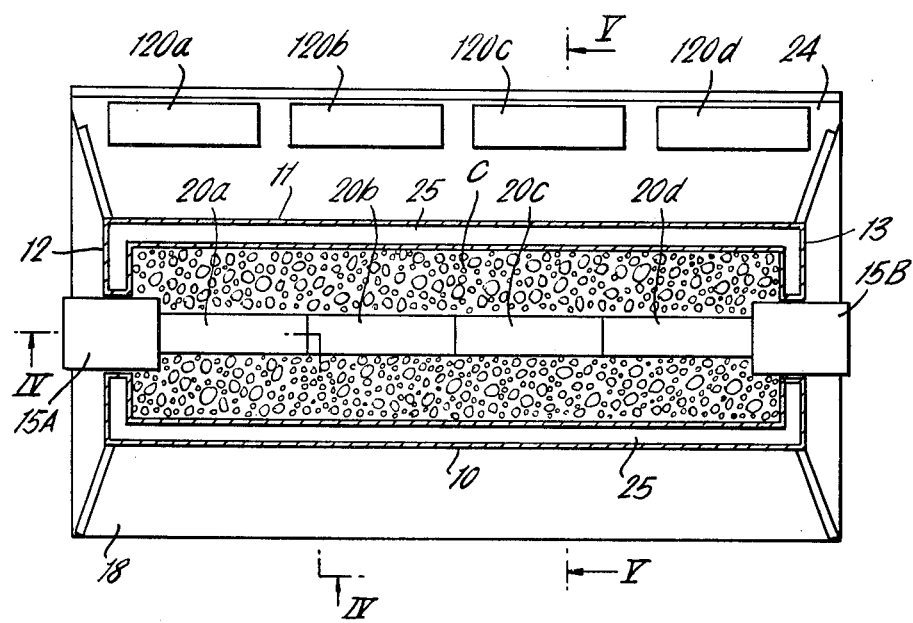
FIG. 1 is a horizontal section of a first embodiment of the continuous furnace of the invention, wherein the electrodes to be graphitized are arranged longitudinally to the furnace, in line.
Figure 4:
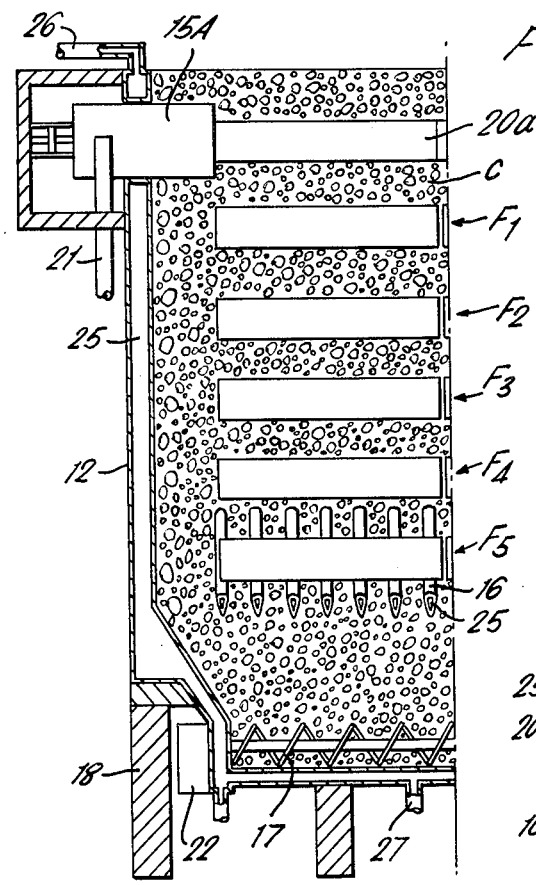
FIG. 4 is schematic sectional view taken along line IV—IV of FIG. 1.
Figure 5:
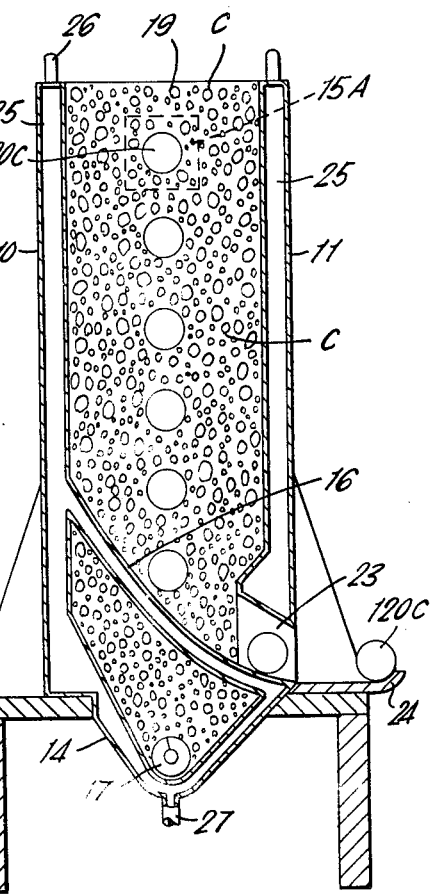
FIG. 5 is a fragmentary sectional view, taken along line V—V of FIG. 1.

With reference to FIGS. 1, 4 and 5, the first embodiment of the improved continuous furnace of the invention comprises, a furnace-body of suitable height having side walls 10 and 11, end walls 12 and 13, and a concave bottom 14; two head electrodes 15A, 15B for the flow of the graphitizing current, mounted in the upper part of end walls 12 and 13; a hollow grate 16, duly cooled, forming a chute, fixed to side wall 10 and having its lower part in the opening 23 through which the cooled electrodes are coming out; extraction means of the screw type for the insulating material, and a base 18 supporting the furnace.

In operation, at the beginning of the cycle for graphitizing the amorphous electrodes, the cavity 19 of the furnace body is filled with granulated insulating material, indicated with C, and the electrodes 20a, 20b, 20c, 20d to be graphitized, are arranged in the upper part thereof, between the head electrodes for the current flow between 15A and 15B.

As better shown in FIG. 1, the electrodes to be graphitized are aligned in abutting contact, with the first electrode 20a in contact with head electrode 15A and the last electrode 20d in contact with head electrode 15B.

At this moment a current flow is passed through electrodes 20 (a, b. . . )which current is supplied to head electrodes 15A and 15B through connection bars 21 (FIG. 4), and the graphitizing process begins.

After approximately a 10 hour period, which is the time required for the graphitizing process, the current flow is cut off and screw conveyor 17 on bottom 14 is operated by motor 22, in order to draw out the granulated insulating material C passing through grate 16 and coming out of bottom 14 through a suitable opening (not shown) on one end thereof. Therefore the level of the bulk of insulating material decreases within the furnace and also the first line of electrodes, now duly graphitized, sinks therewith.

When the bulk of insulating material and the first line of electrodes have been conveniently lowerered within the furnace, for instance down to level of arrow F1 of FIG. 4, screw conveyor 17 is stopped, another line of amorphous electrodes 20a, 20b, etc. is located between the head electrodes 15A, 15B and the upper part of the furnace is filled up with fresh or recovered insulating material. Then the graphitizing process is repeated on the fresh line of amorphous electrodes by a current flow therethrough. At the end of this graphitizing process, the current flow will be cut off again and screw conveyor 17 will be reoperated as explained above, resulting in a lowering of the level of the bulk insulating material within the furnace and consequently of first and second line of already graphitized electrodes, which will lower to levels F2 and F1, respectively.

It should be noted that after each electrode graphitizing process, the upper part of the furnace can be filled up with insulating material either fresh or recovered from the furnace bottom.

The continuous operation of the furnace of the invention will be now evident: each file of graphitized electrodes at different levels F1, F2, will descend within the furnace body after each new graphitizing process, before introducing the new file of electrodes to be graphitized through the furnace top.

Of course the graphitized electrodes are to be taken out of the furnace and in connection therewith grate 16 and opening 23 on bottom of side wall 11 of the furnace are provided.

Graphitized electrodes of the lowest line (in the illustrated embodiment the sixth line from the furnace top at level F6) sink, following grate 16 and stop on shelf 24 in the position of the electrode referenced 120C in FIG. 5.

It is to be noted that, owing to the graphitizing temperature involved, the furnace must be sufficiently deep to accomodate as many vertically spaced electrode lines as required to obtain fully cooled electrodes in the lowest line.

Moreover both the furnace walls and grate 16 must be suitably cooled; accordingly, all walls are hollow and a refrigerating fluid is circulated in the hollow space 25 which fluid is circulated also in the hollow elements of grate 16.

The cooling fluid is supplied from a suitable source (not shown), as a pump or a blower (not shown) in a cooling circuit connected to inlets 27 and outlets 26.

This fluid, being circulated from bottom to top, cools the already graphitized electrodes and performs a preheating of the electrodes to be graphitized, as it reduces the thermal dispersions of the upper operative part of the furnace.

The continuous furnace for graphitizing electrodes as illustrated in FIG. 1 operates satisfactorily, but it necessitates very long connection bars (not shown) to supply the electrical power from the transformer group (not shown) to head electrodes 15A and 15B mounted on opposite end walls 12 and 13. As said bars are made of copper, and therefore very costly, this excessive length is an incconvenience.

Figure 2:
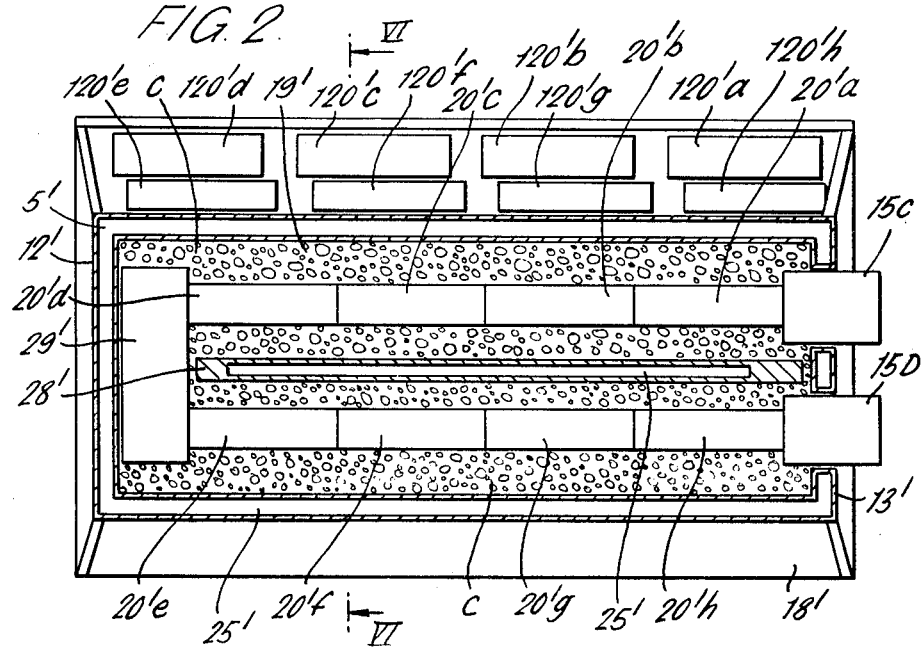
FIG. 2 is a horizontal section of a second embodiment, wherein the electrodes are arranged longitudinally to the electric current flow along a U-shaped path.

In order to eliminate this inconvenience, the embodiment of FIGS. 2 and 6 was devised, wherein both head electrodes, referenced 15C and 15D, are mounted side by side on end wall 13', electrodes 20'a, 20'b etc. being erranged within the furnace cavity 19' on two parallel lines, separated by an insulating partition 28', in electric contact at end wall 12' through a short circuit electrode 29'.

It will be evident that, in this arrangement, the electric bars supplying the electric power from the transformer to head electrodes 15C, 15D are arranged side by side.

The furnace according this second embodiment is very similar to the furnace illustrated with reference to FIGS. 1, 4, 5, having two side walls 10' and 11', two end walls 12' and 13', a longer hollow cooled grate 16', a concave bottom 14' below grate 16', extraction means 17' of the screw type and a mounting base 18' for the furnace.

It will be evident that the operation of the furnace according to this second embodiment of the invention will be identical with the operation above discussed with reference to FIG. 1 and, accordingly, it will not be illustrated again.

Finally in FIGS. 3 and 7, a third embodiment of the invention is illustrated wherein the cylindrical electrodes 20"a, 20"b, etc. are arranged with their axis transversal to the current flow, as in the Acheson type furnaces.

In such a furnace, mounted on a base 18", grate 16" is fixed to end wall 12" which supports a longer head electrode 15E and a similar long head electrode 15F is supported on the other end wall 13".

In this arrangement, the hollow elements of grate 16" are parallel to the furnace longitudinal axis and the graphitized electrodes 120" come out of the opening 23" on end wall 13" (FIG. 7), resting on shelf 24".

It should be noted the further advantageous feature of the furnace of the invention, according to which, after the process, the granulated coke is half graphitized, or at least calcined, and therefore it can be utilized to obtain half graphitized or calcined carbonaceus articles.

Finally, it should be pointed out that the advantageous structure of the furnace of the invention makes it possible to draw and filter all the flue gas produced by the graphitizing process with a single fixed apparatus.

We claim:

1. Continuous graphitizing furnace for carbon electrodes with vertical charge displacement, wherein the charge is formed by granulated insulating material and the electrodes to be graphitized comprising; an elongated hollow furnace body of a given deepness and defined by two side walls, two end walls and a concave bottom; a base for said body; a sloped grate crossing said hollow furnace body, having its upper part fixed to one wall of said defining walls and its lower part in the opposite wall; an exit opening formed along the entire base of said opposite wall; two head electrodes supported by the upper part of said end walls of the furnace; extracting means arranged in said concave bottom for extracting said granulated insulating material; and electrical connecting bars for electrically connecting the power transformer to said head electrodes.

2. Furnace in accordance with claim 1, wherein said walls and grate elements are hollow and the cavities thereof communicate with each other and with at least one source of a cooling medium which is circulated therein, whereby the heat from the graphitized electrodes and the surrounding insulating material can be utilized for preheating the electrodes to be graphitized and reducing the heat loss towards the furnace side walls and outside the furnace.

3. Furnace in accordance with claim 1, wherein one of said head electrodes is mounted on one end wall, the other head electrode is mounted on the other end wall, the upper part of said sloped grate is fixed to one of said walls and the lower part thereof is within said exit opening on the opposite side wall, whereby said electrodes to be graphitized may be arranged in alignment and abutting relationship between said head electrodes, the end electrodes being in electric contact therewith.

4. Furnace in accordance with claim 1 wherein one of said head electrodes is mounted on one end wall the other head electrode is mounted on the opposite end wall; said grate upper part is fixed to said one wall and the lower part thereof is within said exit opening opened on said opposite end wall, whereby said electrodes to be graphitized may be piled within the furnace with their axis transverse to the current flow, with said piles parallel to each other.

5. Furnace according to claim 1 wherein both said head electrodes are mounted on one end wall; a short circuit elongated electrode is mounted on the opposite end wall; said grate upper part is fixed to one of said side walls and the lower part thereof is within said exit opening opened in the lower part of the opposite side wall, and the furnace body cavity is longitudinally divided by an insulating central partition extending downward from the furnace top for the distance concerned by the current flow, whereby the electrodes to be graphitized may be aligned in abutting relationship on two parallel lines, one line being between one head electrode and the corresponding end part of said short-circuit electrode and the other line between the other head electrode and the corresponding end part of said short-circuit electrode, the end electrodes of each line being in electric contact with the head electrode and the short-circuit electrode, respectively.

6. Furnace in accordance with claim 5, wherein said partition is hollow and the cavity thereof is connected to said source supplying the cooling medium.

7. Furnace in accordance with claim 1, wherein said extracting means for the granulated insulating material in the furnace bottom is a powered screw conveyor.

8. Furnace in accordance with claim 1, wherein said extracting means for the granulate insulating material is a discharging hopper operated by gravity, in association with vibrating or pneumatic extractors.

9. The method of continuously graphitizing elongated carbon products which includes, providing a furnace having a cavity accessible from the top, head electrodes in said cavity, means for removing insulating material from the bottom and means for removing the graphitized products from a side, filling substantially the whole furnace cavity with granulated insulating material; placing amorphous elongated carbon blanks to be graphitized on said granulated material between said head electrodes; supplying power to said head electrodes for heating the blanks to be graphitized placed therebetween; cutting off the power supply after said amorphous blanks are graphitized; operating said removing means for removing a portion of said granulated insulating material from the furnace bottom so that the top level of the insulating material level sinks in the furnace cavity, placing a fresh group of amorphous carbon blanks to be graphitized between said head electrodes; filling up again the furnace cavity with granulated insulating material and supplying again the electric current to said head electrodes for the next graphitizing cycle, and repeating the cycle as many times as desired; the graphitized products sinking gradually in the furnace charge and being mechanically separated from the insulating material and removed, when duly cooled, from a side of the furnace.

10. The method of continuously graphitizing elongated carbon products according to claim 9 wherein the product removing means includes a slanting grate in the furnace and an exit opening in the side of the furnace adjacent the lower end of the grate, separation of the graphitized products being effected by lowering them into position against the grate and causing them to be deflected toward the exit opening as the insulating material passes through the grate toward the material removing means.

* * * * *